Dec. 31, 1940.     A. R. COOPER     2,226,896
POWER LAWN MOWER
Filed March 27, 1939
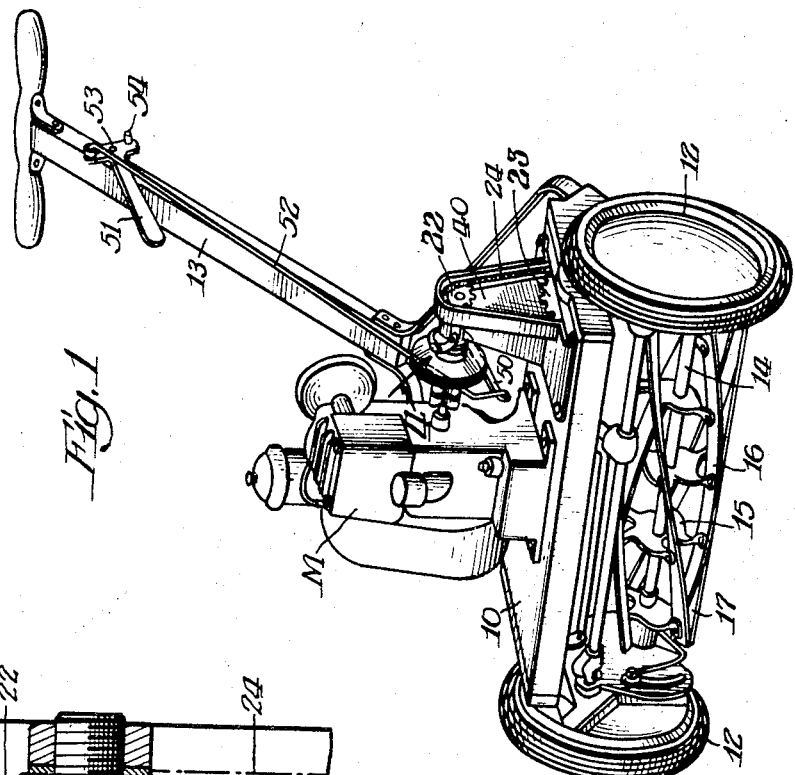
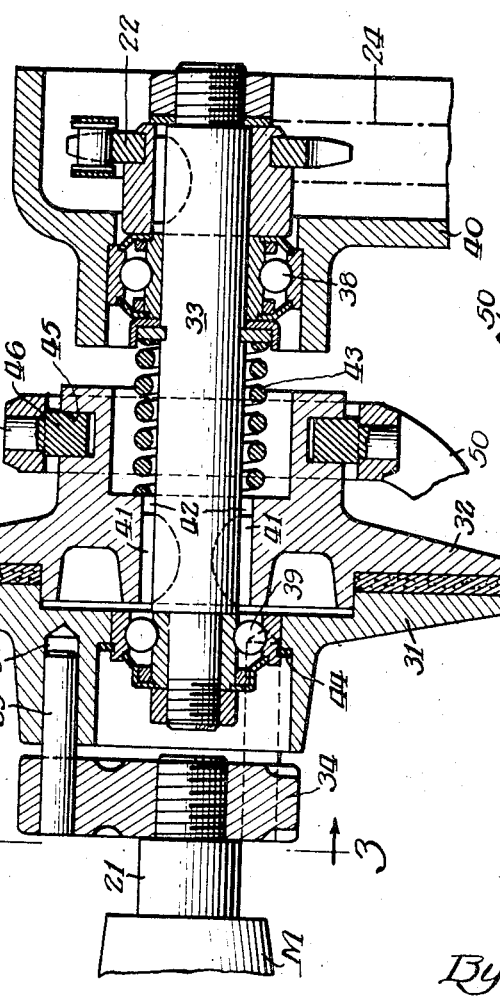
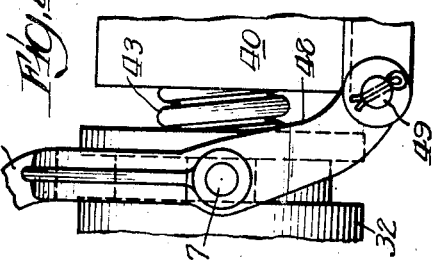
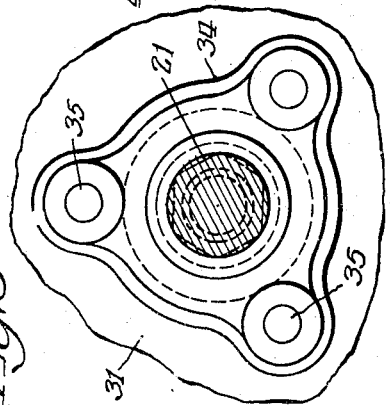
Inventor:
Allyn R. Cooper
By Bair & Freeman Attys.

Patented Dec. 31, 1940

2,226,896

UNITED STATES PATENT OFFICE 2,226,896

POWER LAWN MOWER

Allyn R. Cooper, Marshalltown, Iowa, assignor to Cooper Manufacturing Company, Marshalltown, Iowa, a corporation of Iowa Application March 27, 1939, Serial No. 264,381

4 Claims. (Cl. 192—66)

An object of my invention is to provide a lawn mower having improved details of construction which make the manufacturing of the lawn mower much simpler and inexpensive, yet the lawn mower, when manufactured in accordance with my disclosure, has a relatively long life as compared to the types of mowers now on the market.

A further object is to provide a lawn mower with power means to drive the cutter and the ground wheels thereof and including a clutch mechanism which is simple to construct and efficient in operation with a minimum of strain and wear thrown onto the parts when the clutch is in either engaged or disengaged position.

The foregoing, other and further objects of the present invention will be in part obvious from the accompanying drawing and in part pointed out as the description of the invention progresses. In describing the invention in detail reference will be made to the accompanying drawing wherein is illustrated an embodiment of the invention, like reference characters designating corresponding parts throughout the several views. In said drawing:

Figure 1 is a perspective view of a power lawn mower embodying my invention;

Figure 2 is an enlarged sectional view through the clutch mechanism thereof;

Figure 3 is a sectional view on the line 3—3 of Figure 2 showing an operative connection between a power shaft and a clutch disc; and Figure 4 is a plan view looking in the direction of the arrow 4 adjacent Figure 1 and showing a clutch throw-out yoke.

On the accompanying drawing I have used the reference numeral 10 to indicate a platform. The platform 10 is supported by ground wheels 12 and in turn supports a motor M. A handle 13 is provided for the lawn mower for convenience in controlling and steering it.

A cutter shaft 14 is provided on which is mounted a reel including spiders 15 and reel bars 16. The reel bars 16 cooperate with a stationary cutter bar 17 in the usual manner for cutting grass. The cutter shaft 14 is suitably journaled and driven by mechanism including a sprocket 23 and a chain 24.

The motor M has a power shaft 21 with which a clutch indicated generally at C is operatively connected. The clutch C drives a sprocket 22 which in turn drives the chain 24.

The clutch C includes a pair of clutch discs 31 and 32 and a clutch shaft 33. A spider 34 is mounted on the power shaft 21 and carries a plurality of pins 35 spaced from the axis of the shaft 21 and arranged substantially parallel thereto. The clutch disc 31 is provided with a plurality of bores 37 to slidably receive the pins 35. The clutch shaft 33 is journalled in bearings 38 and 39 which are supported in a stationary bracket 40 and in the clutch disc 31 respectively. The clutch disc 32 is slidably and non-rotatably mounted on the driven shaft 33 by means of keys 41 and key ways 42. A spring 43 is interposed between the clutch disc 32 and the bearings 38.

The bearing 39 is provided with a washer 44 which serves as a stop shoulder for the disc 31. A friction plate or disc 36 is mounted between the discs 31 and 32 and is formed of suitable friction material.

The disc 32 is provided with an annular groove 45 adapted to slidably receive clutch shoes 46. The clutch shoes 46 are provided with pintles 47 pivoted in a clutch yoke 48. The clutch yoke 48 is pivoted to a pin 49 carried by the bracket 40 and has a lever 50 extending therefrom.

A control lever 51 is pivoted on the handle 13 and connected by a rod 52 to the clutch lever 50. In the released position of Figure 1 the spring 43 is free to engage the clutch discs 31 and 32 with each other through the medium of the interposed disc 36 as shown in Figure 2. The control lever 51 is pivoted at 53 to the handle 13 and when the lever is swung rearwardly the clutch disc 32 will be moved away from the clutch disc 31 against the action of the spring 43 until the rod 52 passes over center with relation to the pivot 53 and engages a stop pin 54.

In the operation of my clutch structure, when the clutch lever 50 is released it permits the spring 43 to expand and force the clutch discs 31, 32 and 36 into engagement with each other. This results in the disc 31 engaging the stop washer 44 and thus all rotating load on the bearings 38 and 39 is eliminated. When the clutch is engaged and revolving there is obviously no thrust load on either bearing 38 or 39 as the clutch assembly is entirely self-contained and the thrust of the spring 43 is taken up between the bearings with the clutch discs 31, 32 and 36 interposed between the spring and the bearing 39, the disc 31 in turn bearing against the washer 44 and thus against the bearing 39.

When the clutch is inoperative or disengaged and the motor shaft 21 is rotating thus driving the clutch disc 31 the right hand portion of the clutch is stationary and hence there is no revolving load on the bearing 38 and only the weight of the clutch plate 31 on the bearing 39. This arrangement obviously enables me to provide a clutch which is long wearing and free of trouble from rotating thrust pressure developed on the bearings.

My clutch cooperates with the mechanism of the mower to produce a quiet running power mower having a relatively long period of useful life before there is any necessity of parts replacement or rebuilding.

In accordance with the provisions of the patent statutes I have described my invention together with the principle of operation thereof. The described form I consider to represent the best embodiment thereof but desire it to be understood that the details of structure disclosed are illustrative only and that the invention may be carried out by other means and mechanical equivalents within the scope of the appended claims.

I claim as new and desire to secure by Letters Patent of the United States:

1. In a power lawn mower, a power shaft, a spider carried thereby, a plurality of pins projecting from said spider and arranged substantially parallel to the axis of said power shaft, a clutch disc slidably mounted on said pins, a bearing spaced from and aligned with said power shaft, a driven shaft journalled in said bearing, a second bearing in said clutch disc, said driven shaft being journalled in said second bearing, a second clutch disc slidably and non-rotatably mounted on said driven shaft, a spring interposed between said first bearing and said second disc and normally constraining said second disc to frictionally engage said first disc, said second bearing having a shoulder acting as a stop for said first disc upon engagement of said second disc therewith, a handle for the lawn mower, a control lever mounted thereon for said clutch discs, means connected with said control lever and cooperating with said second disc to disengage it from said first disc against the action of said spring, a cutter shaft and means for transmitting rotation from said driven shaft to said cutter shaft.

2. In a power lawn mower, a power shaft, a spider carried thereby, a plurality of pins projecting from said spider and arranged substantially parallel to the axis thereof, a clutch disc mounted on said pins, a bearing spaced from and aligned with said power shaft, a driven shaft journalled in said bearing, a second bearing in said clutch disc, said driven shaft being journalled in said second bearing, a second clutch disc slidably and non-rotatably mounted on said driven shaft, a spring interposed between said first bearing and said second disc and normally constraining said second disc to frictionally engage said first disc, said second bearing having a shoulder acting as a stop for said first disc upon engagement of said second disc therewith, a cutter shaft and means for transmitting rotation from said driven shaft to said cutter shaft.

3. In a power lawn mower, a power shaft, a clutch connected therewith for rotation thereby, a bearing spaced from and aligned with said power shaft, a driven shaft journalled in said bearing, a second bearing carried by said clutch disc, said driven shaft being journalled in said second bearing, a second clutch disc slidably and non-rotatably mounted on said driven shaft, a spring interposed between said first bearing and said second disc and normally constraining said second disc to frictionally engage said first disc, said second bearing having a stop for said first disc upon engagement of said second disc therewith, a control lever cooperating with said second disc to disengage it from said first disc against the action of said spring, a ground wheel and means to transmit rotation from said driven shaft to said ground wheel.

4. In a device of the class described, a power shaft, a spider carried thereby, a plurality of pins projecting from said spider and arranged substantially parallel to the axis of said power shaft, a clutch disc slidably mounted on said pins, a bearing spaced from and aligned with said power shaft, a driven shaft journalled in said bearing, a second bearing in said clutch disc, said driven shaft being journalled in said second bearing, a second clutch disc slidably and non-rotatably mounted on said driven shaft, a spring interposed between said first bearing and said second disc and normally constraining said second disc to frictionally engage said first disc, said second bearing having a shoulder acting as a stop for said first disc upon engagement of said second disc therewith, and a control lever cooperating with said second disc to disengage it from said first disc against the action of said spring.

ALLYN R. COOPER.